May 8, 1956 L. H. REAGAN 2,744,967
MEANS FOR REDUCING CONTACT CAPACITANCE
Filed Jan. 16, 1953
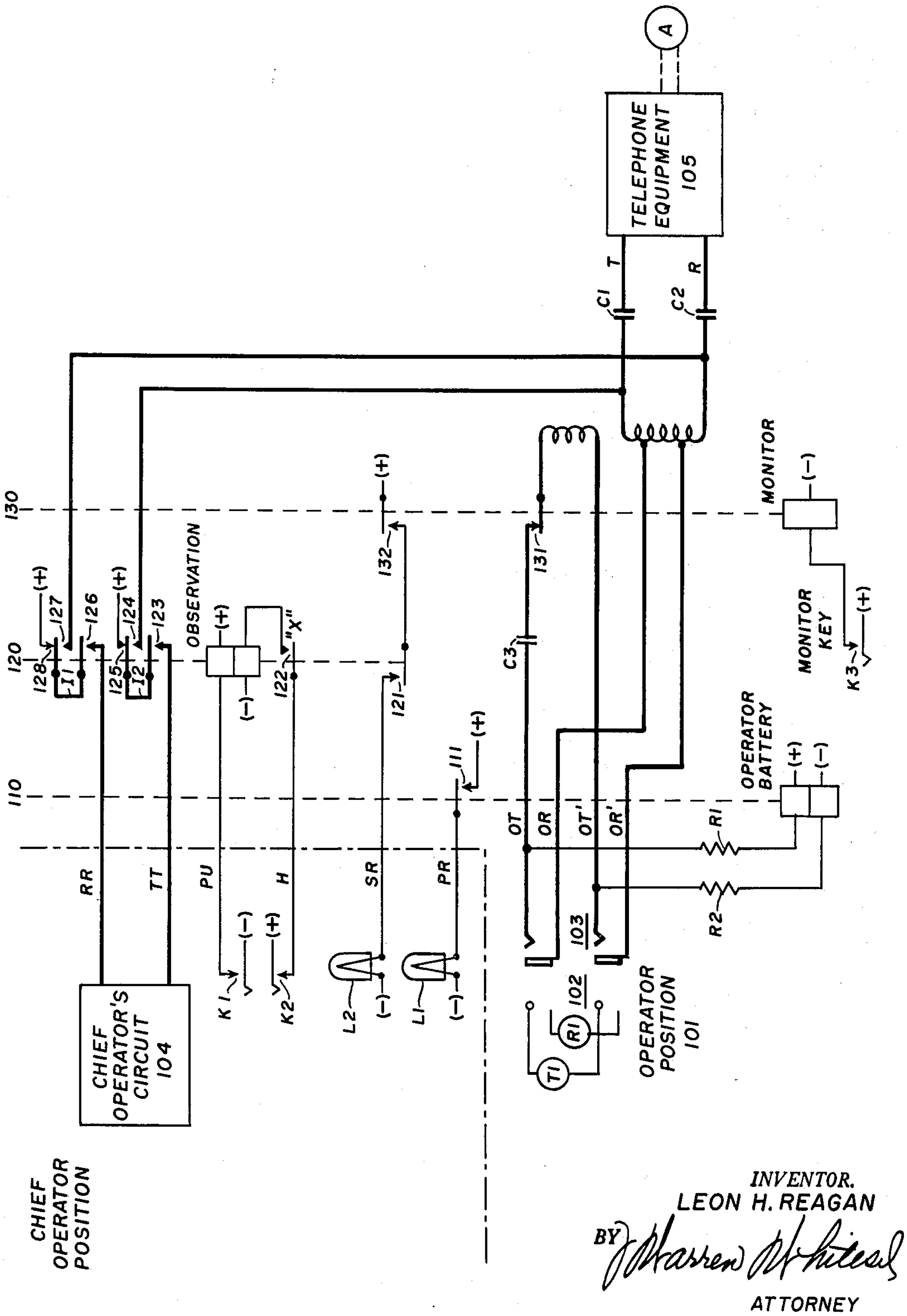
INVENTOR.
LEON H. REAGAN
BY Warren Whitesel
ATTORNEY

United States Patent Office 2,744,967

Patented May 8, 1956

2,744,967

MEANS FOR REDUCING CONTACT CAPACITANCE

Leon H. Reagan, Richland, Wash., assignor, by mesne assignments, to General Dynamics Corporation, a corporation of Delaware Application January 16, 1953, Serial No. 331,628

4 Claims. (Cl. 179—78)

This invention relates to means for reducing contact capacitance in electrical circuits.

Very often electrical circuits include contacts which form a capacitor when open so that two circuits are partially coupled when connections are broken by the contacts. For example, in a telephone circuit these contacts may form a capacitor whereby talking currents are induced across an open gap to produce a background noise which may or may not be intelligible as a conversation but which results in undue noise called "cross-talk."

One object of this invention is to reduce the capacitive coupling at open contacts in an electrical circuit.

Another object of this invention is to increase the impedance to cross-talk currents in the talking path of a telephone circuit.

The drawing shows one embodiment of my invention whereby a chief operator may be connected with a talking circuit leading to an operator position.

As in the case of most telephone circuits, the positive battery terminal is described as connected with ground. For this reason, I refer to the negative pole as (−) battery and the positive pole as grounded (+). It should be understood that this condition could be reversed or that any other well known power source may be used without changing my invention.

Briefly, observation relay 120 has contacts 124 and 127 which are in a talking path including conductors TT and RR, respectively. When open, these contacts form a capacitor across which conversation currents may flow by capacitive coupling. Of course, it is not possible to predict when cross-talk, electrostatic charges, or the like, may occur with 100% accuracy. This is because many unpredictable factors may enter into the problem, for example, how loud a person may talk. To avoid this capacitance, I provide a second set of contacts 123 and 126 to isolate one plate of the open contact capacitor and contacts 125 and 128 to provide a ground connection to this plate thereby eliminating any capacitance coupling tending to interconnect the two ends of conductors TT and RR.

It should be obvious that this relay contact arrangement may be used any time that capacity coupling across a set of open contacts creates a problem. For example, on occasions a bothersome alternating current such as cross-talk, for example, or an electrostatic charge may be avoided by using this arrangement. The expression "draining away electrical currents which may result from capacitive coupling" is used hereinafter to describe all of the situations which may arise. It should be understood to include both alternating currents, electrostatic charges, and the like, as well as all processes such as those called "draining," "by-passing," and the like.

More specifically, my invention shows telephone equipment 105 which may be seized from operator position 101 in any suitable manner such as the interconnection of plug 102 and jack 103, for example. This interconnection of plug and jack causes the operation of operator battery relay 110 over the path extending from grounded (+) through the upper winding of relay 110, resistor R1, conductor OT, the tip connections of jack 103 and plug 102 and transmitter T1, conductor OT′ and resistor R2 to (−) battery by way of the lower winding of relay 110. This path also supplies battery for the operator's transmitter T1. Contacts 111 close thereby completing an obvious circuit to light lamp L1 over conductor RR as an indication that the operator at position 101 has taken position.

If another person, the chief operator, for example, wishes to supervise or monitor operator position 101, key K1 is thrown causing observation relay 120 to operate by way of (−) battery, closed contacts K1, conductor PU, and the upper winding of relay 120 to grounded (+). This relay may be held directly from key K1 or in some instances a locking path may be provided independent of the original operating path, as required. In this case relay 120 closes its preliminary or "x" contacts 122 thereby locking to grounded (+) or conductor H, supplied through contacts K2, when operated. Contacts 123, 124, 126 and 127 operate to complete a talking path from the chief operator's circuit 104 to position circuit 101 via conductors TT and RR. The chief operator 104 may now listen, talk or perform any necessary supervisory functions after which she opens contacts K1 and K2 thereby releasing observation relay 120. Responsive to the release of observation relay 120, contacts 123, 124, 126 and 127 open to break the path over which the chief operator was connected with operator position 101.

If the operator at position 101 wishes to monitor a call, she actuates key K3 thereby operating monitor relay 130 to open contacts 131 and close contacts 132. Contacts 131 open the circuit to transmitter T1 at the operator's headset, thus preventing an annoying battery click and also disabling transmitter T1 so that the operator may not inadvertently be heard by conversing subscribers, such as subscriber "A," for example. At contacts 132, a circuit is completed so that when observation relay 120 operates to close contacts 121, lamp L2 lights if the operator is monitoring. In this manner, the chief operator may distinguish between calls where the operator position 101 is giving service and those where she is merely listening-in.

Means is provided for reducing any cross-talk in the circuit leading from chief operator circuit 104 to position circuit 101 which may result from capacitance at the contacts of relay 120. In the past, only one set of contacts such as 124 and 127, for example, would serve to complete the talking path, there being no relay having duplicate contacts such as 123 and 126. In this case, when contacts 124 and 127 are open, a capacitor is formed in each of their gaps whereby a small portion of the conversation currents may be capacitively coupled to conductors TT and RR thereby creating cross-talk. To avoid this undesirable feature, I provide a second set of contacts 123 and 126 in series with contacts 124 and 127 thus isolating one plate of each of the capacitors at sections I1 and I2. This second set of contacts greatly increases the impedance of the line to cross-talk. Further, I provide a grounded (+) connection at contacts 125 and 128 thereby draining away or by-passing to ground any unwanted currents or charges which otherwise might flow through or be built across the coupling of gaps 124 and 127 and of gaps 123 and 126.

Since the chief operator's circuit is multipled to many operator positions and many cord circuits, it is apparent that cross-talk might otherwise be coupled from one cord circuit to another through open contacts such as 124 and 127. My invention eliminates this type of cross-talk also.

When the operator at position 101 disconnects plug 102 from jack 103, operator battery relay 110 releases thereby opening contacts 111 to extinguish lamp L1 as an indication to the chief operator that position 101 is vacant.

My invention may operate under many different conditions; however, for explanatory purposes only, I have shown an arrangement which may be used in connection with the apparatus shown in my co-pending application, Serial No. 331,627, filed January 16, 1953, both this and the subject invention being assigned to the same assignee. It is obvious that my invention may be used at any place where there are undesirable results from the capacity across open contacts. Therefore, I intend to cover not only the particular embodiment shown, but also to cover all similar modifications which may be obvious to those skilled in the art.

What I claim is:

1. In a telephone system, a circuit means for carrying conversation currents, a relay having at least two pair of opened contact springs, means for connecting said open contacts in series in said circuit means whereby a section of said circuit means is isolated between said open contacts, break contacts operatively associated with the springs of one of said open contacts, means including said break contacts for grounding said isolated section, and means for operating said relay thereby closing said open contacts to complete said circuit means and opening said break contacts to remove said ground connection.

2. In a telephone system, telephone equipment, a first operator position, means for connecting said first operator position and said telephone equipment including a pair of conversation current carrying conductors, a second operator position, means for connecting said second operator position with said pair of conversation current carrying conductors, a relay, said relay having at least four sets of contact springs forming make contacts, break contacts operatively associated with two of said sets of contact springs, means for connecting two of said make contacts in series with each of said conductors whereby a section of each of said conductors is isolated between said make contacts, and means for connecting each of said isolated sections to ground by way of one of said break contacts.

3. A telephone circuit comprising a pair of talking conductors, a relay operative between at least two positions, said relay comprising four sets of contacts which are open when said relay is in one of said positions and two sets of contacts which are closed when said relay is in said one position, each of said talking conductors being connected in series with two of said open contacts whereby an isolated section is formed in each of said conductors and means for connecting each of said isolated sections to ground by way of said closed contacts.

4. In a telephone system, telephone equipment, a first operator position, means for connecting said first operator position and said telephone equipment including conversation current carrying conductors, a second operator position, means for connecting said second operator position with said conversation current carrying conductors, said last named means including at least one set of open contacts, means for reducing cross-talk resulting from capacitance at said open contacts, said last named means comprising means for isolating at least a portion of said conversation current carrying conductors, and means for draining away electrical currents which may result from capacitive coupling between said conductors and said isolated section.

References Cited in the file of this patent

UNITED STATES PATENTS

| | | |
|---|---|---|
| 1,341,719 | Moore | June 1, 1920 |
| 1,740,861 | Hanny | Dec. 24, 1929 |
| 1,792,496 | Hinshaw | Feb. 17, 1931 |
| 1,996,213 | Phelps | Apr. 2, 1935 |

OTHER REFERENCES

Stromberg-Carlson Catalogue, "B" edition, page 162.